(12) United States Patent (10) Patent No.: US 9,232,243 B2
Hunt et al. (45) Date of Patent: Jan. 5, 2016

(54) AUDIO AND VIDEO STREAMING FOR MEDIA EFFECTS

(71) Applicant: NETFLIX, INC., Los Gatos, CA (US)

(72) Inventors: Neil D. Hunt, Los Altos, CA (US); Christian Kaiser, San Jose, CA (US)

(73) Assignee: NETFLIX Inc., Los Gatos, CA (US)

( * ) Notice: Subject to any disclaimer, the term of this patent is extended or adjusted under 35 U.S.C. 154(b) by 0 days.

(21) Appl. No.: 14/498,778

(22) Filed: Sep. 26, 2014

(65) Prior Publication Data

US 2015/0089553 A1 Mar. 26, 2015

Related U.S. Application Data

(63) Continuation of application No. 13/099,312, filed on May 2, 2011, now Pat. No. 8,861,926.

(51) Int. Cl.
| | |
|---|---|
| *H04N 5/93* | (2006.01) |
| *H04N 21/234* | (2011.01) |
| *H04N 21/472* | (2011.01) |
| *H04N 21/81* | (2011.01) |
| *H04N 21/233* | (2011.01) |
| *H04N 21/2387* | (2011.01) |
| *H04N 21/43* | (2011.01) |
| *H04N 21/439* | (2011.01) |
| *H04N 21/6587* | (2011.01) |

(52) U.S. Cl.
CPC ....... *H04N 21/23424* (2013.01); *H04N 21/233* (2013.01); *H04N 21/2387* (2013.01); *H04N 21/23418* (2013.01); *H04N 21/4307* (2013.01); *H04N 21/4394* (2013.01); *H04N 21/47202* (2013.01); *H04N 21/6587* (2013.01); *H04N 21/8106* (2013.01)

(58) Field of Classification Search
CPC .................. H04N 21/23424; H04N 21/23418; H04N 21/47202; H04N 21/8106; H04N 21/233; H04N 21/2387; H04N 21/4307; H04N 21/4394; H04N 21/6587
See application file for complete search history.

(56) References Cited

U.S. PATENT DOCUMENTS

| | | | | |
|---|---|---|---|---|
| 5,504,585 | A * | 4/1996 | Fujinami et al. | 386/356 |
| 5,511,054 | A * | 4/1996 | Oishi et al. | 369/59.27 |
| 6,144,798 | A * | 11/2000 | Nagasawa et al. | 386/281 |
| 7,551,839 | B2 * | 6/2009 | Yamada et al. | 386/239 |
| 8,352,988 | B2 * | 1/2013 | Cleary et al. | 725/58 |
| 2006/0271983 | A1 * | 11/2006 | Katayama et al. | 725/100 |

* cited by examiner

*Primary Examiner* — Tat Chio
(74) *Attorney, Agent, or Firm* — Artegis Law Group, LLP

(57) ABSTRACT

One embodiment of the present invention sets forth a technique for streaming digital media content with transition effects. Audio data may be modulated and received by the streaming device for an audio fade-in effect. Similarly, video data may be modulated to perform various visual effects. Such a technique allows for fading-in of audio and/or video, fading-out of audio and/or video, and effects that blend audio from different content and video from different content during a transition from one digital media content to a different digital media content or within the same digital media content. The modulated audio and video data to generate the audio or video effect during a transition may be precomputed or computed in real-time and transmitted to the streaming device. The streaming device switches between original unmodulated content streams and effect content streams when transitions are detected.

25 Claims, 9 Drawing Sheets

AUDIO AND VIDEO STREAMING FOR MEDIA EFFECTS

CROSS-REFERENCE TO RELATED APPLICATIONS

This application is a continuation of co-pending U.S. patent application Ser. No. 13/099,312, filed May 2, 2011. The subject matter of this related application is hereby incorporated herein by reference.

BACKGROUND OF THE INVENTION

1. Field of the Invention

Embodiments of the present invention relate generally to digital media and, more specifically, to streaming media effects using audio data and video data.

2. Description of the Related Art

Digital media content distribution systems conventionally include a content server, a content player, and a communications network connecting the content server to the content player. The content server is configured to store digital media content files, which can be downloaded from the content server to the content player. Each digital media content file corresponds to a specific identifying title, such as "Gone with the Wind," which is familiar to a user. The digital media content file typically includes sequential content data, organized according to playback chronology, and may comprise audio data, video data, or a combination thereof.

The content player is configured to download and play a digital media content file, in response to a user request selecting the title for playback. The process of playing the digital media content file includes decoding audio and video data into a synchronized audio signal and video signal, which may drive a display system having a speaker subsystem and a video subsystem. Playback typically involves a technique known in the art as "streaming," whereby the content server sequentially transmits the digital media content file to the content player, and the content player plays the digital media content file while content data is received that comprises the digital media content file. To account for variable latency and bandwidth within the communications network, a content buffer queues the incoming content data ahead of the content data actually being played. During moments of network congestion, which leads to lower available bandwidth, less content data is added to the content buffer, which may drain down as content data is being de-queued to support playback at a certain playback bit rate. However, during moments of high network bandwidth, the content buffer is replenished and additional buffer time is added until the content buffer is generally full again. In practical systems, the content buffer may queue content data corresponding to a time span ranging from seconds to more than a minute.

Each digital media content file stored on the content server typically includes video data that is processed before being output for display. The processing may include decoding the video data to raw frames of PCM streams. The processed video data is then output for display. In contrast, the audio data is passed from the content server to an output device, e.g., speakers, without modification. Consequently, playback volume is entirely controlled by a volume setting for the output device and the decoded audio signal is modulated using simple calculations based on the volume setting.

For some digital media content, a preview clip may be designated corresponding to a pivotal moment in a movie. In some cases, the audio data is very loud, e.g., a battle scene, and the output volume control of the content player may also be set at a high level based on the previous content playback. When playback of the preview clip starts, the resulting output volume level of the audio signal may be unpleasantly high. Because the audio data is passed form the content server to the content player without modification, it is not possible to decrease the volume level by modulating the audio data before the audio data is provided to the content player.

As the foregoing illustrates, what is needed in the art is an ability to modulate the audio data without requiring the viewer to adjust the volume control of the content player.

SUMMARY OF THE INVENTION

One embodiment of the present invention sets forth a method for streaming digital media content with transition effects. The method comprises the steps of receiving a playback location within the digital media content which includes an original data stream that is encoded as a sequence of intervals and determining a nearest interval in the original data stream relative to the playback location. A first interval of an effect data stream that comprises a modulated version of the original data stream is retrieved, where the first interval corresponds to the nearest interval in the original data stream. One or more additional intervals of the original data stream are retrieved, where the one or more additional intervals are subsequent to the nearest interval in the sequence of intervals. The first interval of the effect data stream is played and while playing the first interval of the effect data stream, it is determined that an interval boundary is reached. In response, the one or more additional intervals of the original data stream are played in sequence.

One advantage of the disclosed technique is that audio data may be modulated and received by the streaming device for an audio fade-in effect. Similarly, video data may be modulated to perform various visual effects. Such a technique allows for fading-in of audio and/or video, fading-out of audio and/or video, and effects that combine audio from different content and video from different content during a transition between from one content to another. A consumer may personalize the video and/or audio effects that are applied during transitions. The modulated audio and video data to generate the effect may be precomputed or computed in real-time and transmitted to the streaming device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
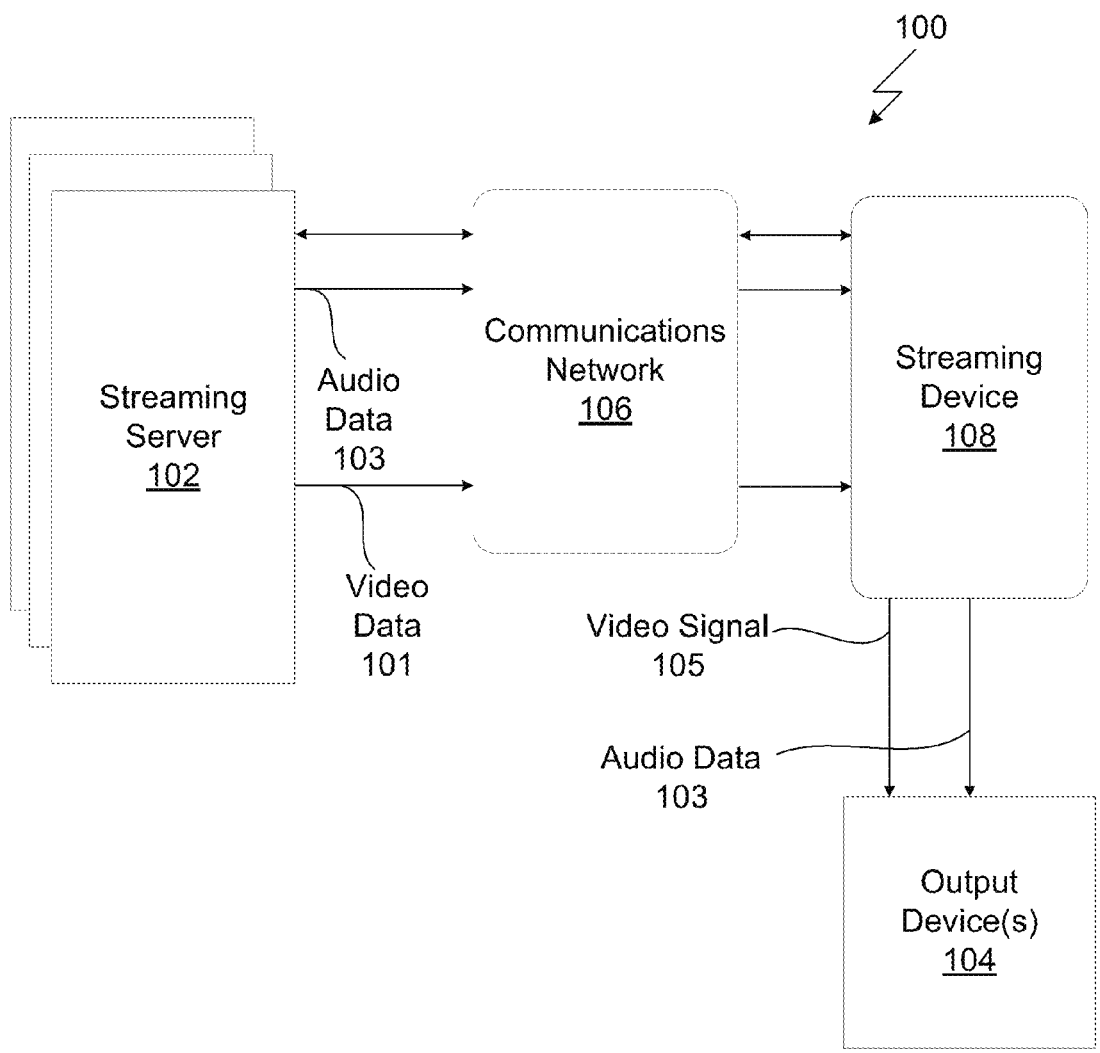
FIG. 1 illustrates a content distribution system configured to implement one or more aspects of the present invention.

FIG. 1 illustrates a content distribution system 100 configured to implement one or more aspects of the invention. As shown, the content distribution system 100 includes a streaming server 102, a communications network 106, a streaming device 108, and a output device(s) 104. The content distribution system 100 may include a plurality of communications networks 106, such as routers and switches, configured to facilitate data communication between the streaming server 102 and the streaming device 108. The output device(s) 104 is configured to produce a display image and associated sound and is typically directly coupled to the streaming device 108 by a wired or wireless connection. Persons skilled in the art will recognize that many technically feasible techniques exist for transmitting data between the streaming server 102, the streaming device 108 and the output device(s) 104, including technologies practiced in deploying the well-known internet communications network.

The streaming server 102 is a computer system configured to encode video and/or audio streams associated with digital media content files for streaming. The content distribution system 100 maybe include one or more streaming servers 102, where each streaming server 102 is configured to perform all the functions needed to encode the video and/or audio streams or where each streaming server 102 is configured to perform a particular function needed to encode the video and/or audio streams. The digital media content files including the encoded video and audio streams are retrieved by the streaming device 108 via the communications networks 106 for output to the output device(s) 104.

As shown in FIG. 1, audio data 103 and video data 101 represent the encoded audio and video streams that are transmitted from the streaming server 102 to the streaming device 108. The streaming device 108 passes the audio data 103 through to the output device 104 unchanged. The video data 101 is uncompressed (if in a compressed format) or decoded into raw frames or PCM (pulse code modulated) intervals and output by the streaming device 108 to the output device(s) 104 as video signal 105. The output device(s) 104 may include a display device and speaker device for presenting video image frames, and generating acoustic output, respectively.

The streaming server 102 comprises one or more computer systems configured to serve download requests for digital media content files from the streaming device 108. The digital media content files may reside on a mass storage system accessible to the computer system. The mass storage system may include, without limitation, direct attached storage, network attached file storage, or network attached block-level storage. The digital media content files may be formatted and stored on the mass storage system using any technically feasible technique. A data transfer protocol, such as the well-known hyper-text transfer protocol (HTTP), may be used to download digital media content files from wherever the digital media content files are stored to the streaming device 108.

The streaming device 108 may comprise a computer system, a set top box, a mobile device such as a mobile phone, or any other technically feasible computing platform that has network connectivity and is coupled to or includes the output device(s) 104. The streaming device 108 is configured for streaming, i.e., to download units of a video stream encoded to a specific playback bit rate. In one embodiment, the streaming device 108 is configured to switch to downloading subsequent units of a video stream encoded to a different playback bit rate based on prevailing bandwidth conditions within the communications network 106. As bandwidth available within the communications network 106 becomes limited, the streaming device 108 may select a video stream encoded to a lower playback bit rate. As the bandwidth increases, a video stream encoded to a higher playback bit rate may be selected. The audio stream is typically a much lower playback bit rate than the corresponding video stream and is therefore not typically encoded at different playback bit rates.

Although, in the above description, the content distribution system 100 is shown with one streaming device 108, persons skilled in the art will recognize that the architecture of FIG. 1 contemplates only an exemplary embodiment of the invention. Other embodiments may include any number of streaming device 108. Thus, FIG. 1 is in no way intended to limit the scope of the present invention in any way.

Figure 2:
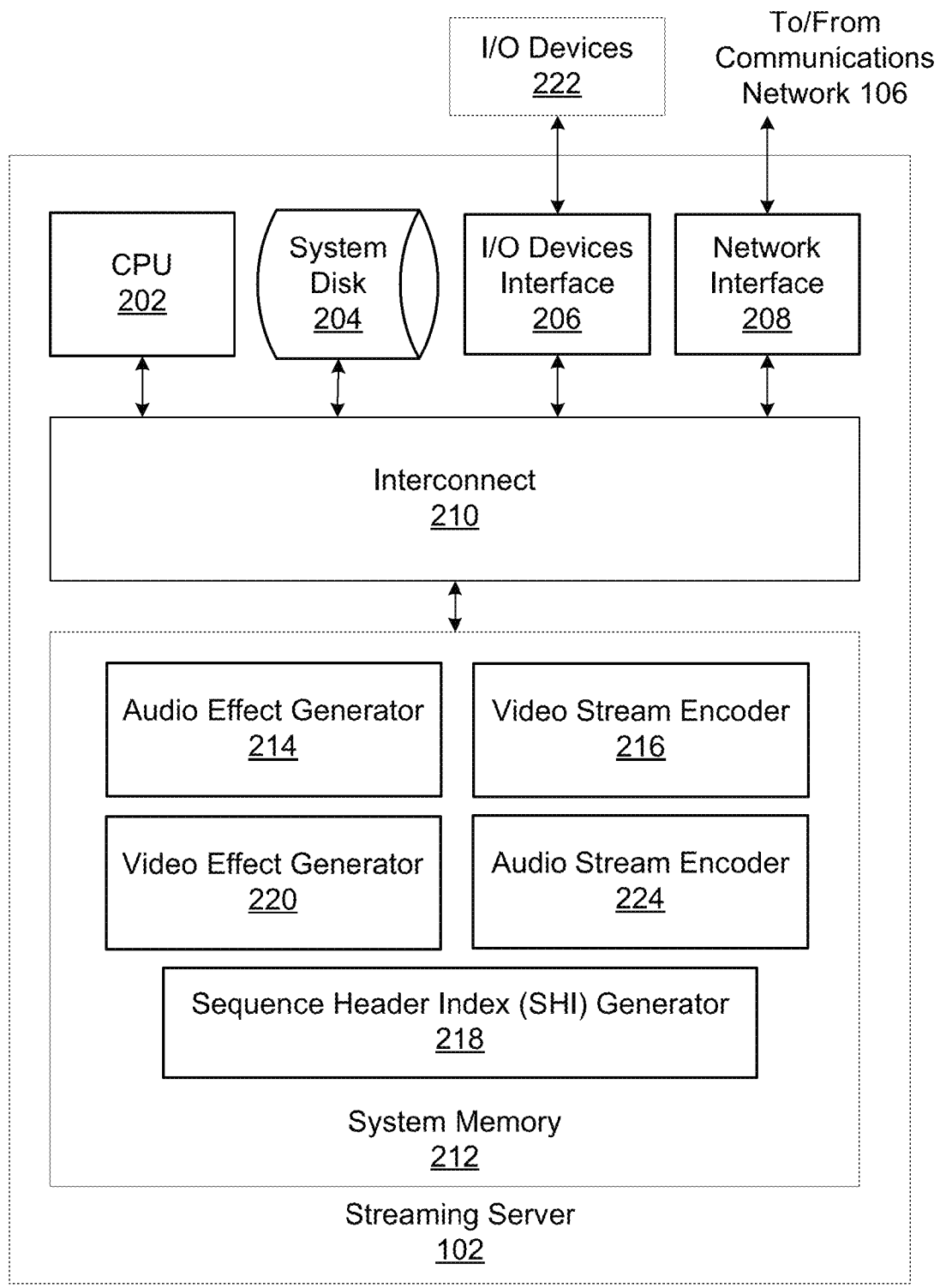
FIG. 2 is a more detailed view of the streaming device of FIG. 1, according to one embodiment of the invention.

FIG. 2 is a more detailed view of the streaming server 102 of FIG. 1, according to one embodiment of the invention. As shown, the streaming server 102 includes a central processing unit (CPU) 202, a system disk 204, an input/output (I/O) devices interface 206, a network interface 208, an interconnect 210 and a system memory 212.

The CPU 202 is configured to retrieve and execute programming instructions stored in the system memory 212. Similarly, the CPU 202 is configured to store application data and retrieve application data from the system memory 212. The interconnect 210 is configured to facilitate transmission of data, such as programming instructions and application data, between the CPU 202, the system disk 204, I/O devices interface 206, the network interface 208, and the system memory 212. The I/O devices interface 206 is configured to receive input data from I/O devices 222 and transmit the input data to the CPU 202 via the interconnect 210. For example, I/O devices 222 may comprise one or more buttons, a keyboard, and a mouse or other pointing device. The I/O devices interface 206 is also configured to receive output data from the CPU 202 via the interconnect 210 and transmit the output data to the I/O devices 222. The system disk 204, such as a hard disk drive or flash memory storage drive or the like, is configured to store non-volatile data such as encoded video streams. The encoded video streams can then be retrieved by the streaming device 108 via the communications network 104. The network interface 218 is coupled to the CPU 202 via the interconnect 210 and is configured to transmit and receive packets of data via the communications network 104. In one embodiment, the network interface 208 is configured to operate in compliance with the well-known Ethernet standard.

The system memory 212 includes software components that include instructions for encoding one or more audio and video streams associated with a specific content title for streaming. As shown, these software components include an audio effect generator 214, a video stream encoder 216, an audio stream encoder 224, a sequence header index (SHI) generator 218, and a video effect generator 220.

The video stream encoder 216 executes encoding operations for encoding a video stream to a specific playback bit rate such that the encoded video stream complies with a particular video codec standard, such as VC1, and is configured for streaming. In an alternative embodiment, the video stream can be encoded to comply with a different video codec standard such as MPEG or H.264. In operation, for a particular video stream, the video stream encoder 216 encodes the video stream to different constant bitrates to generate multiple encoded video streams, each encoded video stream associated with a different constant bitrate and, thus, having a different quality. An encoded video stream generated by the video stream encoder 216 includes a sequence of groups of pictures (GOPs), each GOP comprising multiple image frames of video data. In practice, a GOP may include multiple scenes or portions of a scene. A GOP typical corresponds to 2.5 seconds or 10 seconds of playback time, although other durations may also be used. A GOP is specific to video data and one or more GOPs are included in an interval. For each interval of video data, there may be a corresponding interval of audio data. The video and audio streams each include a sequence of intervals.

The SHI generator 218 generates a sequence header index associated with each encoded video stream. To generate the sequence header index, the SHI generator 218 first searches the encoded video stream for the key frames associated with the different intervals included in the encoded video stream. The key frames can be located by the SHI generator 218 based on the sequence start codes specified in the sequence headers included in the key frames. For the interval associated with each of the identified key frames, the SHI generator 218 defines a switch point within the sequence header index that stores (i) a data packet number that identifies the data packet that includes the key frame associated with the interval and (ii) the playback offset associated with the interval. Again, the playback offset associated with the interval is determined based on the location of the interval in the sequence of intervals included in the encoded video stream.

The audio stream encoder 224 executes encoding operations for encoding an audio stream to a specific playback bit rate such that the encoded audio stream is configured for streaming and synchronization with the video stream. The sequence header indexes associated with each encoded video stream that are generated by the SHI generator 218 are also associated with the encoded audio stream. The switch points defined by the SHI generator 218 within the sequence header index stores (i) a data packet numbers that identifies the data packet for the audio data corresponding to each interval of the audio and video data and (ii) the playback offset in the audio data associated with each interval of the audio data.

The audio effect generator 214 and the video effect generator 220 are configured to generate encoded audio and video streams, respectively, based on a specified effect, e.g., fade-in, fade-out, dissolve, zoom-in, zoom-out, three-dimensional rotation, spiraling, particle burst, page turn, page roll, page peel, distortion, and the like. In sum, any function may be applied to an audio or video data to modulate the audio or video data, respectively. In one embodiment, a fade-in audio stream may be generated by the audio effect generator 214 for a preview clip corresponding to a pivotal moment in a movie. When a preview clip is selected for playback, the fade-in audio stream may be retrieved by the streaming device 108 so that the resulting output volume of the audio signal starts at a low level and increases to the full level of the original audio during a fade-in time envelope. The fade-in ensures that the audio volume level is not unpleasantly high at the start of the preview clip. Because the audio data 103 is passed from the streaming server 102 to the streaming device 108 without modification, the fade-in audio stream is precomputed by the streaming server 102 or may be generated on-the-fly, i.e., in real-time, by the streaming server 102 when adequate computation resources are available. The streaming device 108 typically is not configured with enough computation resources to perform the modulation of the audio stream on-the-fly.

Figure 3A:
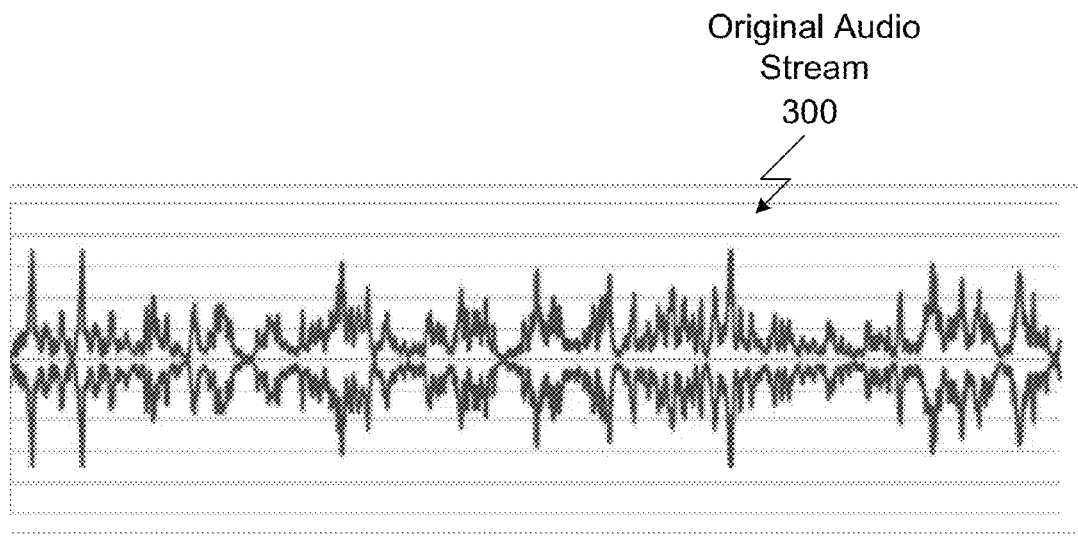
FIG. 3A is an illustration of an original audio stream generated by the streaming server of FIG. 1, according to one embodiment of the invention.

FIG. 3A is an illustration of an original audio stream 300 that is encoded by the streaming server 102 of FIG. 1, according to one embodiment of the invention.

Figure 3B:
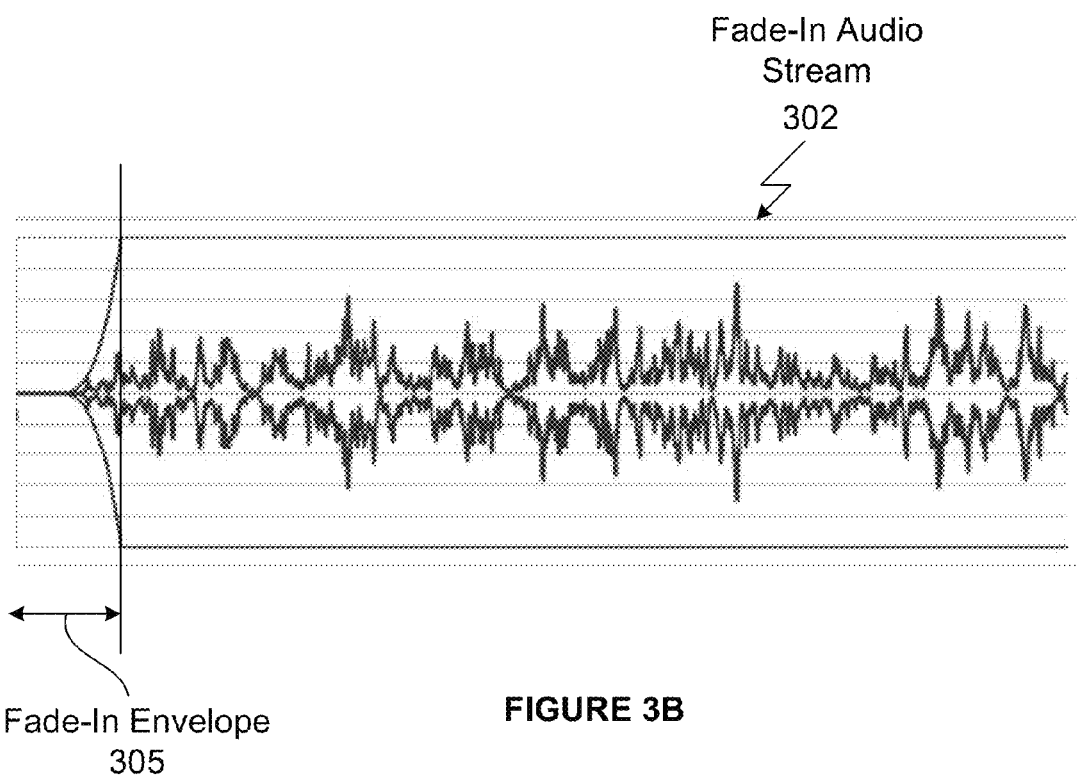
FIG. 3B is an illustration of a fade-in audio stream generated by the audio effect generator of FIG. 2, according to one embodiment of the invention.

FIG. 3B is an illustration of a fade-in audio stream 302 generated by the audio effect generator 214 of FIG. 2, according to one embodiment of the invention. During a fade-in envelope 305 the original audio stream 300 is modulated to start at the lowest volume level and then increase across the fade-in envelope to match the volume level of the original audio stream 300 at the same point in time. After the fade-in envelope 305 the fade-in audio stream 302 matches the original audio stream 300.

In one embodiment, the audio effect generator 214 precomputes the fade-in audio stream 302 and the entire fade-in audio stream 302 is provided to the streaming device 108 instead of the original audio stream 300. In another embodiment, the audio effect generator 214 computes the fade-in audio stream 302 on-the-fly when the corresponding content is requested by the streaming device 108. The audio stream 300 or 302 provides the clock track for playback of the audio and video streams. Therefore, switching from one audio stream to another audio stream, such as switching from the fade-in audio stream 302 to the original audio stream 300, is only possible when the different audio streams are encoded to have the same playback time intervals and the same playback offsets. The streaming device 108 may be configured to switch between different encoded audio streams and between different encoded video streams.

Figure 3C:
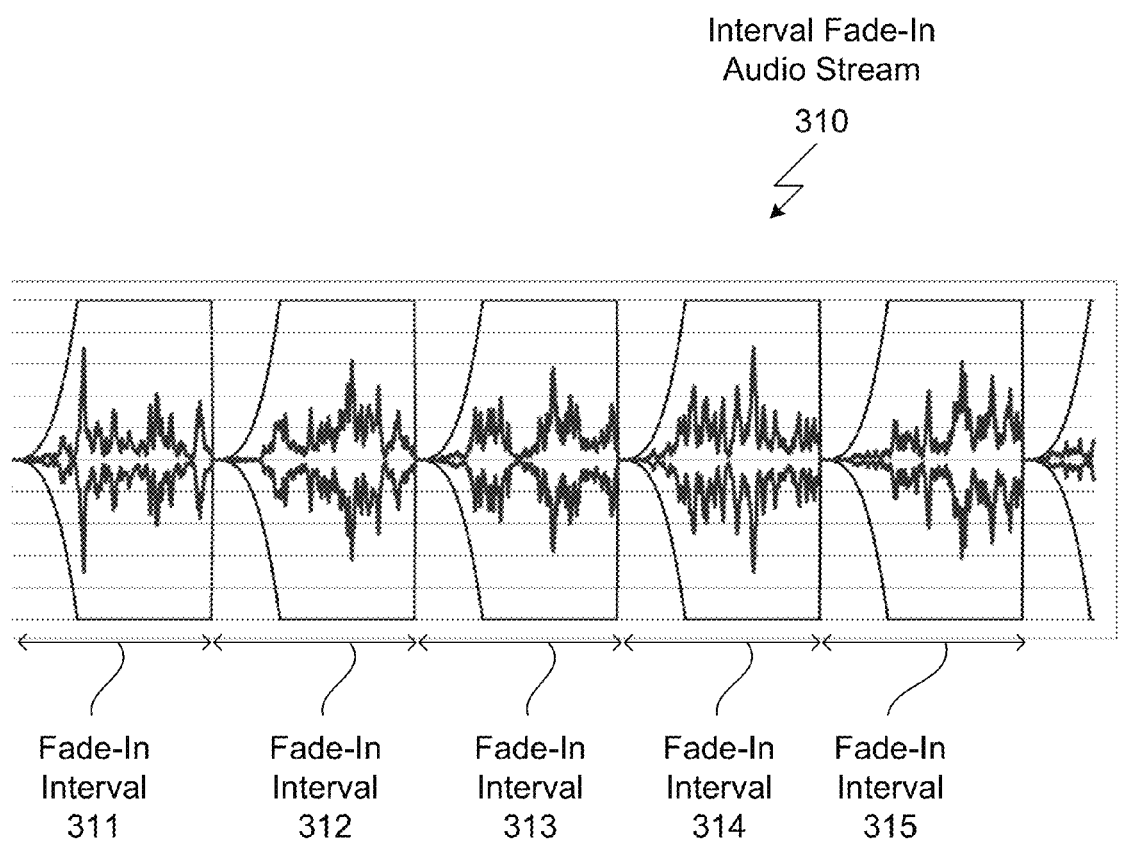
FIG. 3C is an illustration of another fade-in audio stream generated by the audio effect generator of FIG. 2, according to one embodiment of the invention.

FIG. 3C is an illustration of an interval fade-in audio stream 310 generated by the audio effect generator 214 of FIG. 2, according to one embodiment of the invention. For each interval of the original audio stream 300, a fade-in interval 311, 312, 313, 314, and 315 is generated to produce the interval fade-in audio stream 310. Fade-in intervals 312, 313, 314, and 315 are subsequent to fade-in interval 311 in the interval fade-in audio stream 310. Interval fade-in audio stream 310 provides a fade-in audio signal at multiple start locations of the content, not just starting from the beginning as is the case for the fade-in audio stream 302.

During each fade-in interval 311, 312, 313, 314, and 315, the original audio stream 300 is modulated to start at the lowest volume level and then increase to match the volume level of the original audio stream 300 at the same point in time. The streaming device 108 may be configured to start playing the content at the start of an interval. The streaming device 108 retrieves the fade-in interval and switches from the interval fade-in audio stream 310 to the original audio stream 300 after retrieving one fade-in interval from the interval fade-in audio stream 310. The streaming device 108 may fade-in the audio stream following a trick play, e.g., fast-forward or rewind activity, at any interval boundary.

The video effect generator 220 of FIG. 2 may be configured to generate intervals of video data based on specific video effects. Video streams may be generated with one or more intervals generated according to a video effect. Different video streams may be generated for each different video effect. The video streams are encoded and may be requested by the streaming device 108 to display the video effect at transitions between different content, at the start of play, following a trick play, or at the end of play. Similarly, the audio effects may be output at transitions between different content, at the start of play, following a trick play, or at the end of play.

Additionally, at transitions, a video transition stream that encodes a blended version of the ending video stream and the starting video stream may be retrieved by the streaming device 108 and output to the output device(s) 104. Similarly, an audio transition stream that encodes a blended version of the ending audio stream and the starting audio stream may be retrieved by the streaming device 108 and output to the output device(s) 104. Various audio and/or video effects may be applied to generate the video or audio transition streams that are a blended version of two different video or audio streams for a transition interval. The two different video or audio streams maybe from different locations in the same digital media content or from different digital media content. The video and audio transition streams may be precomputed or generated on-the-fly and may be considered as a particular type of fade-in stream.

In addition to generating multiple encoded video and audio streams for specified effects, the streaming server 102 may generate multiple encoded video streams associated with the same content title and encoded to different playback bit rates. The encoding process implemented by the streaming server 102 ensures that, across the different encoded video and audio streams the intervals are associated with the same playback time interval and that corresponding intervals across the different encoded video and audio streams are associated with the same playback offsets. Therefore, each switch point defined in a sequence header included in one of the encoded video stream associated with a specific content title has a corresponding switch point defined in a sequence header included in each of the other encoded video stream associated with the same content title. Similarly, when multiple encoded audio streams are generated, the audio data corresponding to the interval are associated with the same playback time interval and the same playback offsets. The streaming device 108 may switch between different encoded video streams based on the interval boundaries defined by the corresponding sequence header indices. Importantly, in order to properly switch between the different audio streams, the switch points defined by the SHI generator 218 within the sequence header index for the audio streams are matching in terms of time duration, bytes, and indices.

Figure 4A:
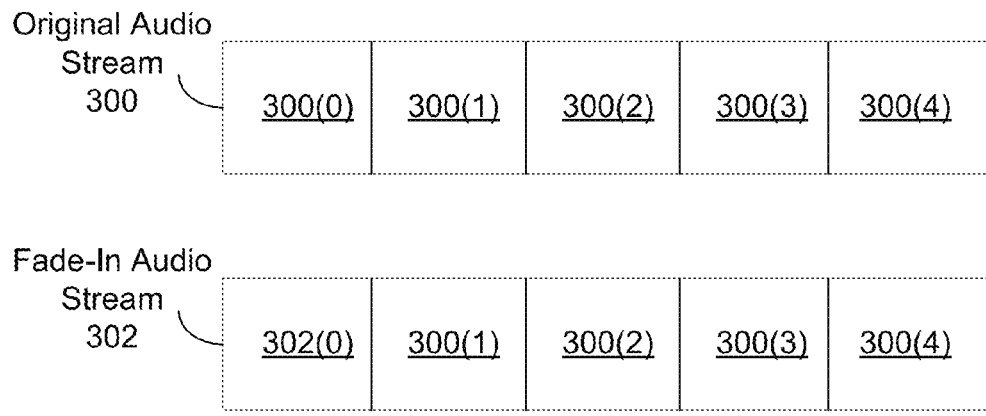
FIG. 4A is an illustration of the original audio stream and the fade-in audio stream encoded using fixed rate audio intervals, according to one embodiment of the invention.

FIG. 4A is an illustration of the original audio stream 300 and the fade-in audio stream 302 encoded using fixed rate audio intervals, according to one embodiment of the invention. Each audio interval in the audio stream corresponds to an interval of the video stream and is associated with the same digital media content. The original audio stream 300 encoding generates audio intervals 300(0), 300(1), 300(2), 300(3), and 300(4). The fade-in audio stream 302 encoding generates audio intervals 302(0), 300(1), 300(2), 300(3), and 300(4).

Audio interval 302(0) is the modulated audio signal for the fade-in effect during the fade-in envelope 305. Because a fixed rate encoding is performed, each interval is of equal and constant length in terms of bytes and playback duration. Video data may also be encoded using constant bit rates to generate video streams having different effects and having different constant bit rates for the same content.

When the fade-in audio stream 302 is retrieved by the streaming device 108, for viewing a preview clip, there is no need to switch between the fade-in audio stream 302 and another audio stream. However, after a trick play, the audio stream resumes playback at an interval boundary, not necessarily at the start of the fade-in audio stream 302. Therefore, the interval fade-in audio stream 305 may be retrieved for one of the intervals nearest to the playback point. After one interval is retrieved from the interval fade-in audio stream 305, the streaming device 108 switches to the original audio stream 300.

The streaming device 108 can efficiently switch between the encoded video streams and/or audio streams by identifying the appropriate switch points in the sequence header indices. When switching between a currently playing encoded audio stream and a different encoded audio stream, the streaming device 108 searches the sequence header index included in the different encoded audio stream to locate the particular switch point specifying the playback offset associated with the next interval to be played. The streaming device 108 can then switch to the new encoded audio stream and download the interval stored in the data packet specified at the particular switch point for playback. For example, for encoded video streams where each interval was associated with a playback time interval of three seconds, if the first interval associated with the playback offset of zero seconds were currently being played, then the next interval to be played would be associated with the playback offset of three seconds. In such a scenario, the streaming device 108 searches the sequence header associated with the new encoded stream for the particular switch point specifying a playback offset of three seconds. Once locating the particular switch point, the streaming device 108 would download the interval stored in the data packet specified in the switch point for playback.

Figure 4B:
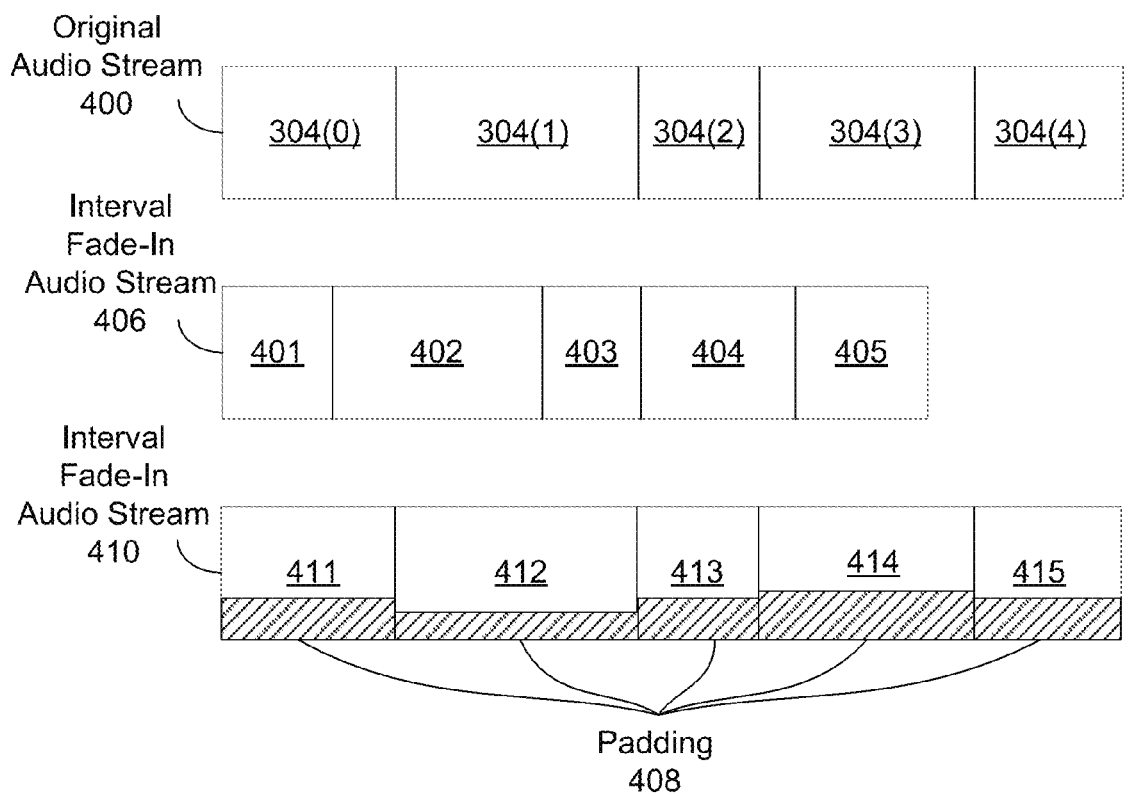
FIG. 4B is an illustration of the original audio stream and the fade-in audio stream encoded using variable rate audio intervals, according to one embodiment of the invention.

FIG. 4B is an illustration of the original audio stream 300 and the interval fade-in audio stream 310 encoded using variable bit rate (VBR) audio intervals, according to one embodiment of the invention. Rather than encoding the video and audio streams at a fixed bit rate, each interval is encoded based on the content for the respective interval. For example, interval for a scene of low complexity is encoded to a lower bit rate to "save" bits for scenes having a higher complexity. The average bit rate across a VBR video stream is, thus, not reflective of the bit rate of a particular interval within the VBR video stream.

The VBR encoded original audio stream 400 includes intervals 304(0), 304(1), 304(2), 304(3), and 304(4) corresponding to intervals 300(0), 300(1), 300(2), 300(3), and 300(4) of the original audio stream 300, respectively. The interval fade-in audio stream 406 is the VBR encoding of the interval fade-in audio stream 310. Intervals 401, 402, 403, 404, and 405 are the encoded fade-in intervals 311, 312, 313, 314, and 315, respectively. Note that the interval boundaries are not aligned between the original audio stream 400 and the interval fade-in audio stream 406 due to the VBR encoding. Therefore, the switch points for the different audio streams are different and the streaming device 108 cannot easily locate corresponding intervals in the different audio streams. In order to easily switch between the different audio streams, the switch points defined by the SHI generator 218 within the sequence header index for the audio streams match in terms of time duration, bytes, and indices.

The interval fade-in audio stream 410 includes VBR encoded intervals that match the intervals in the VBR encoded original audio stream 400 in terms of time duration, bytes, and indices. Intervals 411, 412, 413, 414, and 415 are the encoded fade-in intervals 311, 312, 313, 314, and 315, respectively, and intervals 411, 412, 413, 414, and 415 correspond to intervals 304(0), 304(1), 304(2), 304(3), and 304 (4) of the VBR encoded original audio stream 400, respectively. The intervals 411, 412, 413, 414, and 415 may be generated by including padding 408 in one or more of the intervals 401, 402, 403, 404, and 405 to match the length in bytes of the corresponding intervals of the original audio stream 400, e.g., intervals 304(0), 304(1), 304(2), 304(3), and 304(4). The streaming device 108 may easily locate corresponding intervals in the original audio stream 400 and the interval fade-in audio stream 410 in order to switch between the two audio streams at any interval boundary. Video data may be similarly encoded using a fixed bit rate or variable bit rate and the streaming device 108 may switch between different video streams at interval boundaries.

Prior to initiating playback, the streaming device 108 may measure available bandwidth from the content server and select a digital media content file having a bit rate that can be supported by the measured available bandwidth. To maximize playback quality, a digital media content file with the highest bit rate not exceeding the measured bandwidth is conventionally selected. To the extent the communications network 106 can provide adequate bandwidth to download the selected digital media content file while satisfying bit rate requirements, playback proceeds satisfactorily. In practice, however, available bandwidth in the communications network 106 is constantly changing as different devices connected to the communications network 106 perform independent tasks.

To counter the variability of network conditions, adaptive streaming may be implemented where, for each title, multiple video streams having different fixed bit rates exist. As the network conditions vary, the streaming device 108 may switch between video streams according to the network conditions. For example, video data may be downloaded from video streams encoded to higher fixed bit rates when the network conditions are good, and, when the network conditions deteriorate, subsequent video data may be downloaded from video streams encoded to lower fixed bit rates. The bit rate of the audio stream is typically much lower than the bit rate of the video stream, so the audio stream is typically only encoded for a single fixed bit rate. Because the bit rate for a particular interval of a VBR encoded video stream is not fixed, adaptive stream is best suited for use with fixed bit rate streams.

Figure 5A:
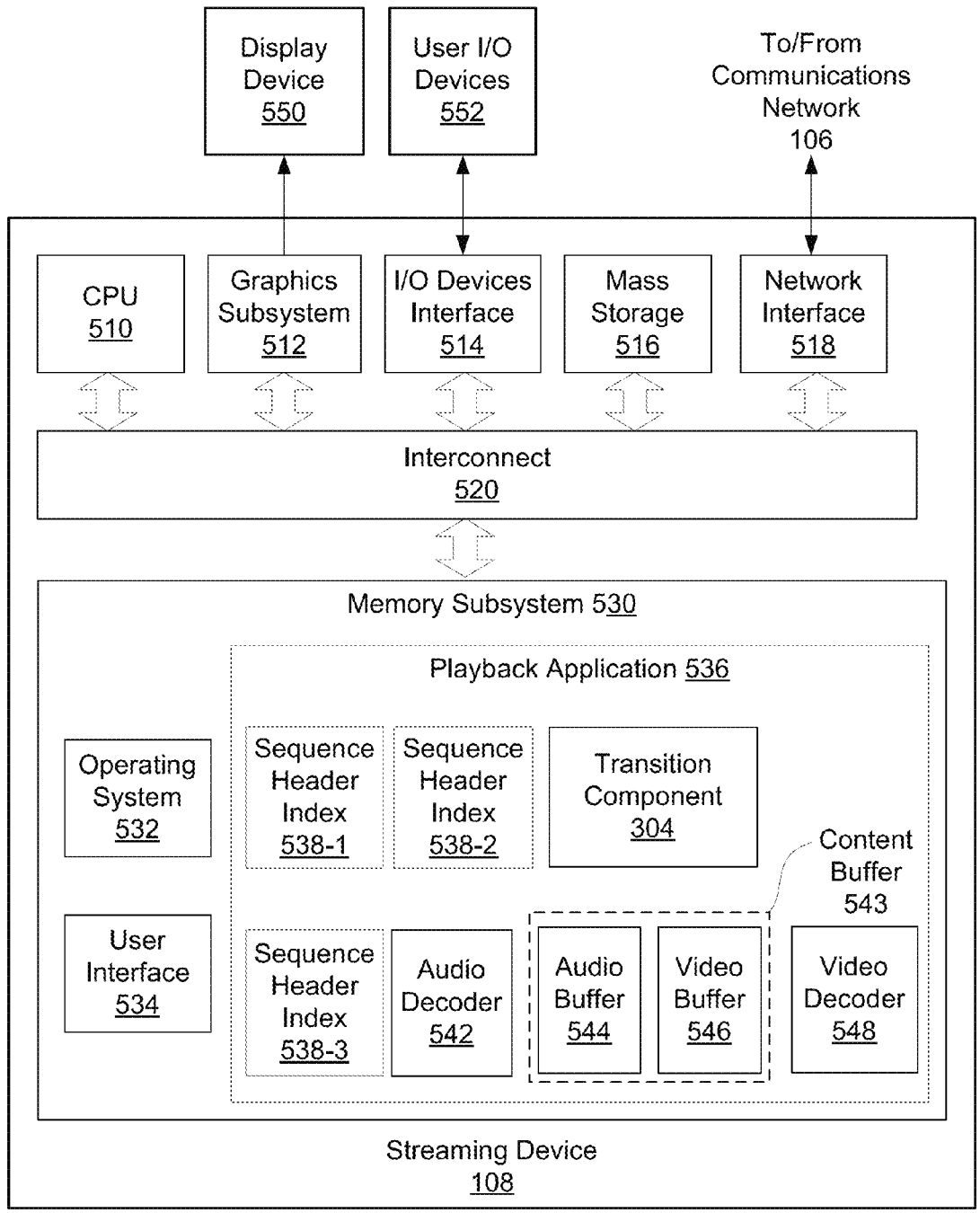
FIG. 5A is a more detailed view of the streaming device of FIG. 1, according to one embodiment of the invention.
Figure 5B:
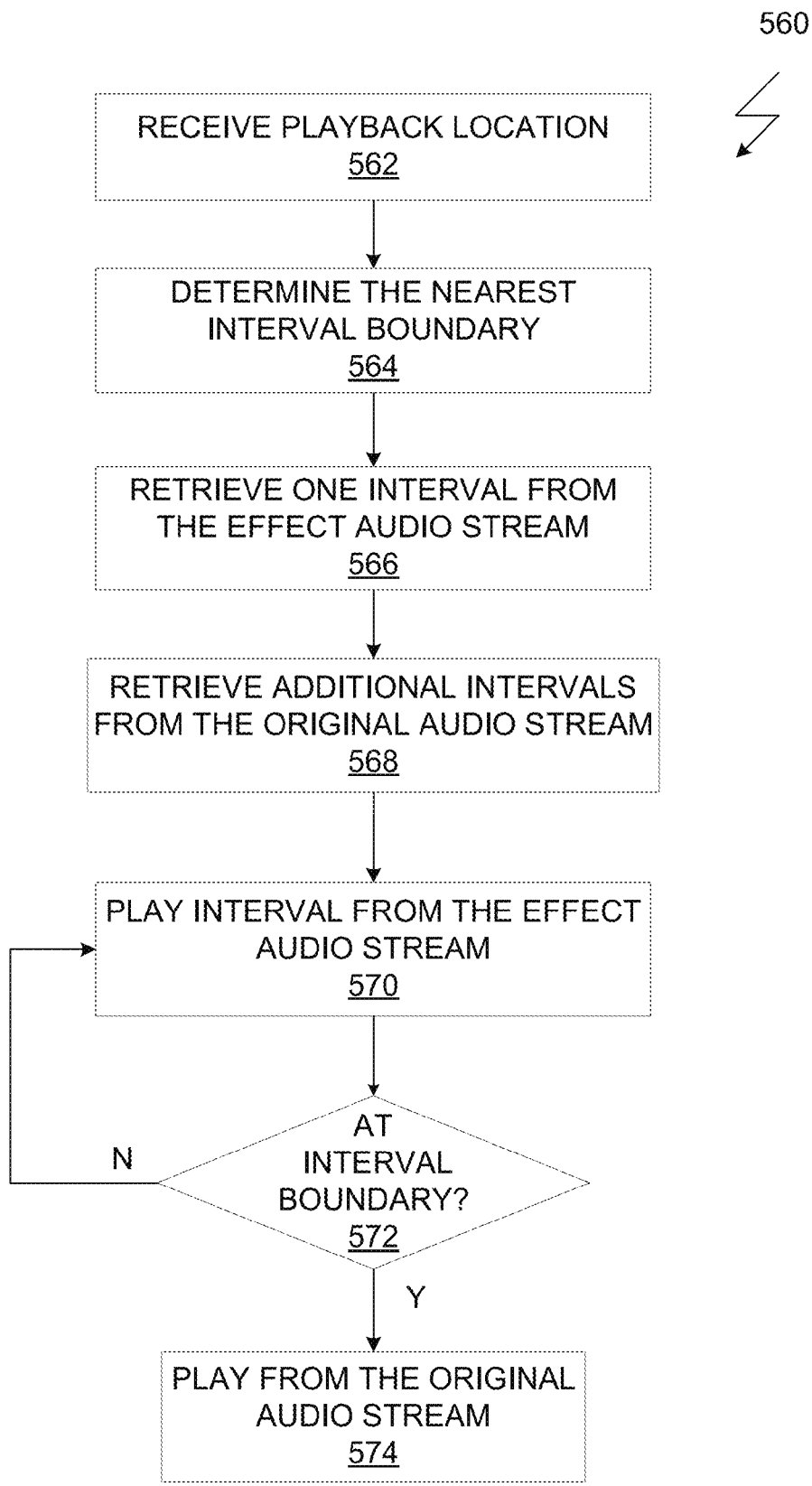
FIG. 5B is a flow diagram of method steps for playing the fade-in audio stream and transitioning to the original audio stream, according to one embodiment of the invention.

FIG. 5B is a more detailed view of the streaming device 108 of FIG. 1, according to one embodiment of the invention. As shown, the streaming device 108 includes, without limitation, a central processing unit (CPU) 510, a graphics subsystem 512, an input/output (I/O) device interface 514, a network interface 518, an interconnect 520, and a memory subsystem 530. The streaming device 108 may also include a mass storage unit 516.

The CPU 510 is configured to retrieve and execute programming instructions stored in the memory subsystem 530. Similarly, the CPU 510 is configured to store and retrieve application data residing in the memory subsystem 530. The interconnect 520 is configured to facilitate transmission of data, such as programming instructions and application data, between the CPU 510, graphics subsystem 512, I/O devices interface 514, mass storage 516, network interface 518, and memory subsystem 530.

The graphics subsystem 512 is configured to generate image frames of video data and transmit the frames of video data to display device 550. In one embodiment, the graphics subsystem 512 may be integrated into an integrated circuit, along with the CPU 510. The display device 550 may comprise any technically feasible means for generating an image for display. For example, the display device 550 may be fabricated using liquid crystal display (LCD) technology, cathode-ray technology, and light-emitting diode (LED) display technology (either organic or inorganic). An input/output (I/O) device interface 514 is configured to receive input data from user I/O devices 552 and transmit the input data to the CPU 510 via the interconnect 520. For example, user I/O devices 552 may comprise one of more buttons, a keyboard, and a mouse or other pointing device. The I/O device interface 514 also includes an audio output unit configured to generate an electrical audio output signal. User I/O devices 552 includes a speaker configured to generate an acoustic output in response to the electrical audio output signal. In alternative embodiments, the display device 550 may include the speaker. A television is an example of a device known in the art that can display video frames and generate an acoustic output. A mass storage unit 516, such as a hard disk drive or flash memory storage drive, is configured to store non-volatile data. A network interface 518 is configured to transmit and receive packets of data via the communications network 106. In one embodiment, the network interface 518 is configured to communicate using the well-known Ethernet standard. The network interface 518 is coupled to the CPU 510 via the interconnect 520.

The memory subsystem 530 includes programming instructions and data that comprise an operating system 532, user interface 534, and playback application 536. The operating system 532 performs system management functions such as managing hardware devices including the network interface 518, mass storage unit 516, I/O device interface 514, and graphics subsystem 512. The operating system 532 also provides process and memory management models for the user interface 534 and the playback application 536. The user interface 534 provides a specific structure, such as a window and object metaphor, for user interaction with streaming device 108. Persons skilled in the art will recognize the various operating systems and user interfaces that are well-known in the art and suitable for incorporation into the streaming device 108.

The playback application 536 is configured to retrieve digital media content, e.g., audio and video streams, from the streaming server 102 via the network interface 518 and play the digital media content through the graphics subsystem 512. The graphics subsystem 512 is configured to transmit a rendered video signal to the display device 550. In normal operation, the playback application 536 receives a request from a user to play a specific title. The playback application 536 then identifies the different encoded video streams associated with the requested title, wherein each encoded video stream is encoded to a different playback bit rate. A preview clip may be encoded separately from the requested title or may be indicated by an index into the video and audio streams encoded for the requested title.

After the playback application 536 has located the encoded video streams associated with the requested title, the playback application 536 downloads sequence header indices associated with each encoded video stream associated with the requested title from the streaming server 102. As previously described herein, a sequence header index associated with an encoded video stream includes information related to the encoded sequence included in the digital media content file.

In one embodiment, the playback application 536 begins downloading the digital media content file associated with the requested title comprising the encoded sequence encoded to the lowest playback bit rate to minimize startup time for playback. For the purposes of discussion only, the digital media content file is associated with the requested title and comprises the encoded sequence encoded to the lowest playback bit rate. The requested digital media content file is downloaded into the content buffer 543, configured to serve as a first-in, first-out queue. In one embodiment, each unit of downloaded data comprises a unit of video data or a unit of audio data. As units of video data associated with the requested digital media content file are downloaded to the streaming device 108, the units of video data are pushed into the content buffer 543. Similarly, as units of audio data associated with the requested digital media content file are downloaded to the streaming device 108, the units of audio data are pushed into the content buffer 543. In one embodiment the units of video data are stored in video buffer 546 within the content buffer 543, and units of audio data are stored in audio buffer 544, also within the content buffer 543.

A video decoder 548 reads units of video data from the video buffer 546, and renders the units of video data into a sequence of video frames corresponding in duration to the fixed span of playback time. Reading a unit of video data from the video buffer 546 effectively de-queues the unit of video data from the video buffer 546 (and from the content buffer 543). The sequence of video frames is processed by graphics subsystem 512 and transmitted to the display device 550.

An audio decoder 542 reads units of audio data from the audio buffer 544, and processes the units of audio data into a sequence of audio samples, generally synchronized in time with the sequence of video frames. In one embodiment, the sequence of audio samples is transmitted to the I/O device interface 514, which converts the sequence of audio samples into the electrical audio signal. The electrical audio signal is transmitted to the speaker within the user I/O devices 552, which, in response, generates an acoustic output.

Given the bandwidth limitations of the communications network 106, the playback application 536 may download consecutive portions of video data from different constant bit rate encoded video streams based on available bandwidth. Other performance factors that may influence the specific encoded stream from which to download the portion of video data include the buffer size of the video buffer 546, the behavior of the end-user viewing the video content, the type of display being generated (high-definition, standard-definition, etc) and the available lead time. These factors combined with the bandwidth limitations of the communications network 106 may be used to determine a specific encoded video stream from which to download each interval of the video data.

The transition component 304 receives content playback information including the content title and playback starting point. The transition component 304 determines the nearest interval in the digital media content at which to retrieve the audio and video streams and controls transitions between different streams. The sequence header indexes 538-1, 538-2, and 538-3 are each associated with a respective video or audio stream and are used by the transition component 304 to locate switch points defined by the SHI generator 218 within each stream. The transition component 304 may switch from playing a first audio and/or video stream at an interval boundary to playing a second audio and/or video stream.

Any of the video or audio streams may be a stream that represents a video or audio effect, including an effect that blends two different streams to produce a transition. For example, a fade-out audio stream may be blended with a fade-in audio stream for the same interval to generate an audio stream for transitions between different content titles. A fade-out audio stream is generated as a version of the original data stream that starts at a full volume level and decreases in volume level across the first interval of the second effect data stream. Similarly, a dissolve video stream or fade-out video stream may be blended with a fade-in video stream for the same interval to generate a video stream for transitions between the different content titles. A fade-in video stream is generated as a version of the original data stream that starts at a low visibility level and increases the visibility level across the first interval of the effect data stream. A fade-out video stream is generated as a version of the original data stream that starts at a full visibility level and decreases the visibility level across the first interval of the second effect data stream.

FIG. 5B is a flow diagram 560 of method steps for playing the fade-in audio stream 302 or the interval fade-in audio stream 310 and transitioning to the original audio stream 300, according to one embodiment of the invention. Although the method steps are described in conjunction with the systems for FIGS. 1, 2 and 5A, persons skilled in the art will understand that any system configured to perform the method steps, in any order, is within the scope of the invention.

At step 562, the playback application 536 receives a playback location associated with the digital media content for which playback has been initiated. The playback location may be at the start of the digital media content when the digital media content is first selected or at any timestep of the digital media content, including the start, following a trick play. At step 564, the playback application 536 rounds down from the playback location to the nearest interval boundary. When the playback location coincides with an interval boundary, the playback application 536 uses the coinciding interval. In other embodiments, the playback application 536 may be configured to select the nearest interval boundary, rounding upward or downward as needed.

At step 566, the playback application 536 retrieves one interval from the effect audio stream, e.g., interval fade-in audio stream 310 or interval fade-in audio stream 410. When the playback location is the start of the digital media content, the playback application 536 may retrieve interval 302(0) from the fade-in audio stream 302. When the playback application 536 is configured to perform a transition and a transition stream is available for the one interval, the playback application 536 retrieves the one interval of the transition stream as the effect audio and/or video stream. At step 568, the playback application 536 initiates retrieval of additional intervals that follow the one interval in sequence, from the original audio stream 300.

At step 570, the playback application 536 plays the one interval from the effect audio stream. At step 572 the playback application 536 determines if an interval boundary has been reached during playback, and, if not, then the playback application 536 repeats step 570 to continue playing the one interval. Otherwise, at step 574, an interval boundary is reached and the playback application 546 transitions to play from the original audio stream 300.

The technique shown in FIG. 5B may also be used to transition between video streams at the interval boundaries. In this manner audio and/or video effects may be implemented when the playback application 536 transitions from one digital media content to a different digital media content. A transition may also include beginning playback of a first digital media content when there is no previous digital media content or ending playback of a last digital media content without playing another digital media content. Finally, audio and/or video effects may be implemented when the playback application 536 transitions from one location in a digital media content to a different location in the same digital media content, i.e., following a trick play.

In order to select a specific encoded video stream from a set of fixed bit rate encoded video streams representing the same video data, the playback application 536 executing on the streaming device 108 may be configured to dynamically determine the encoding level (high, medium, or low bit rate) of the video stream for the next portion of the video data to be downloaded during playback of a different (previous) portion of the digital media content.

Figure 6A:
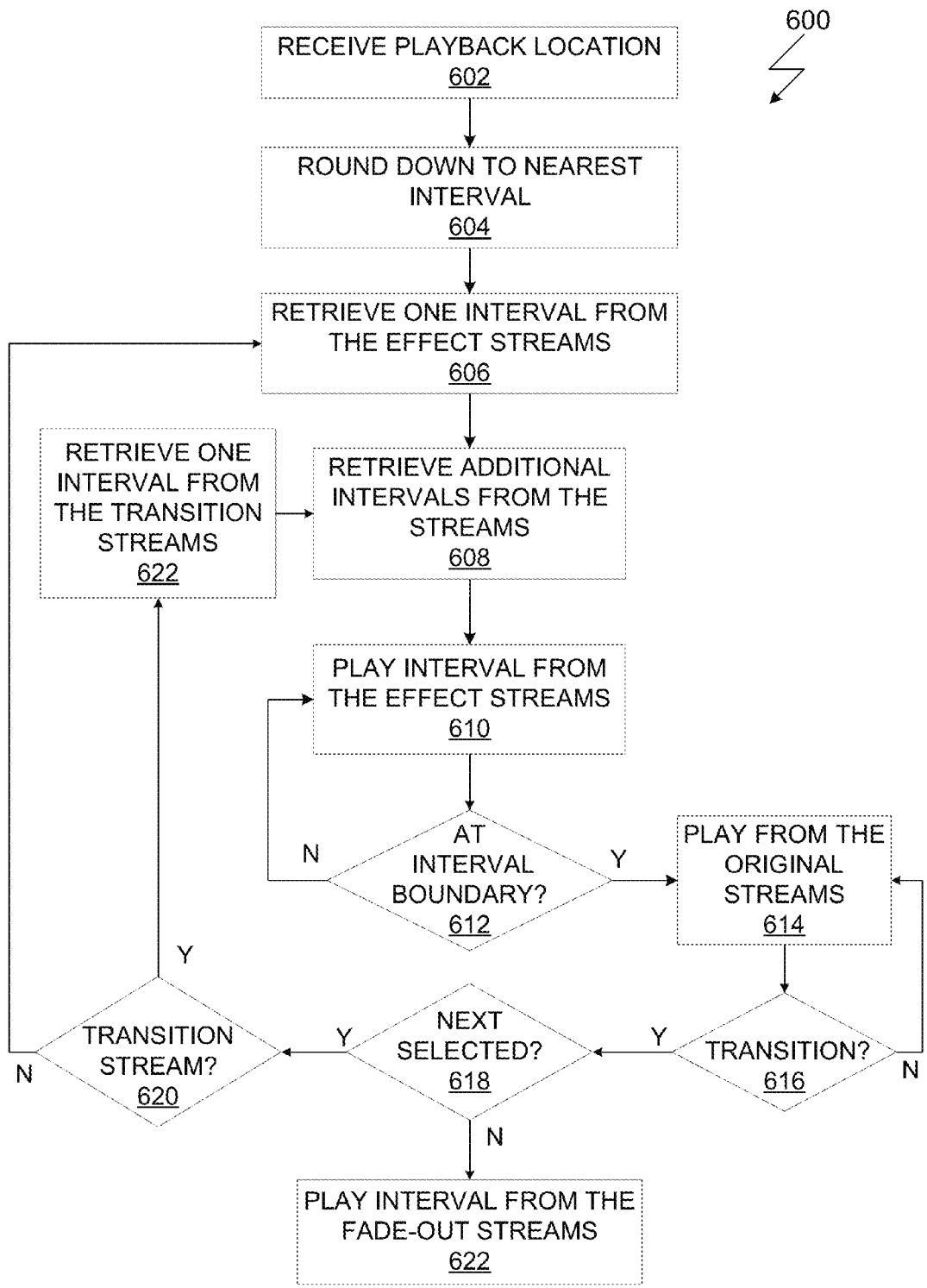
FIG. 6A is a flow diagram of method steps for playing fade-in and fade-out audio and video streams and transitioning to the original audio and video streams, according to one embodiment of the invention.

FIG. 6A is a flow diagram 600 of method steps for playing effect audio and video streams and transitioning to the original audio and video streams and transitioning between streams of different digital media content, according to one embodiment of the invention. Although the method steps are described in conjunction with the systems for FIGS. 1, 2 and 5A, persons skilled in the art will understand that any system configured to perform the method steps, in any order, is within the scope of the invention.

At step 602, the playback application 536 receives a playback location associated with the digital media content for which playback has been initiated. The playback location may be at the start of the digital media content when the digital media content is first selected or at any timestep of the digital media content, including the start, following a trick play. At step 604, the playback application 536 determines the interval boundary closest to the playback location, i.e., by rounding down or rounding up. When the playback location coincides with an interval boundary, the playback application 536 uses the coinciding interval.

At step 606, the playback application 536 retrieves one interval from the interval audio and/or video effect streams, e.g., fade-in streams. At step 608, the playback application 536 initiates retrieval of additional intervals from the original audio and video streams.

At step 610, the playback application 536 plays the one interval from the effect audio and video streams, e.g., fade-in or transition streams. At step 612 the playback application 536 determines if an interval boundary has been reached during playback, and, if not, then the playback application 536 repeats step 610 to continue playing the one interval. Otherwise, at step 614, an interval boundary is reached and the playback application 546 transitions to play from the original audio and video streams.

When digital media content is near a transition boundary, such as the end of the digital media content, the playback application 536 may transition from the original audio and video streams to different effect audio and video streams, e.g., fade-out effect streams. In some cases, the end of the digital media content may not be reached because the user selects a new playback location using a trick play or because the user selects different digital media content for playback.

At step 616 the playback application 536 determines if a transition boundary has occurred during playback, and, if not, then the playback application 536 repeats step 614 to continue playing the digital media content. Otherwise, at step 616, a transition boundary is reached and at step 620 the playback application 536 determines if the next digital media content (if any) has been selected. When the next digital media content has not been selected, then at step 522 the playback application 536 plays the one interval from the fade-out audio and video streams. Alternatively, at step 622 the playback application 536 may retrieve and play different effect streams or the original streams for the last interval.

Otherwise, at step 618 when the next digital media content has been selected, and at step 620 the playback application 536 determines if a transition stream is available. When a transition stream is available for the interval and digital media content(s), then at step 622 the playback application 536 retrieves one interval from the transition streams before returning to step 608. When a transition stream is not available the interval and digital media content(s), then the playback application 536 returns to step 606 and retrieves one interval from the effect streams of the selected digital video content.

The technique described in conjunction with FIG. 6A may be used to fade out a preview clip or to dynamically assemble a sequence of clips from different digital media content, transitioning between the different digital media content by retrieving and playing transition intervals that blend an interval from the previously played digital media content with the same interval from the next digital media content or a different location in the same digital media content.

Figure 6B:
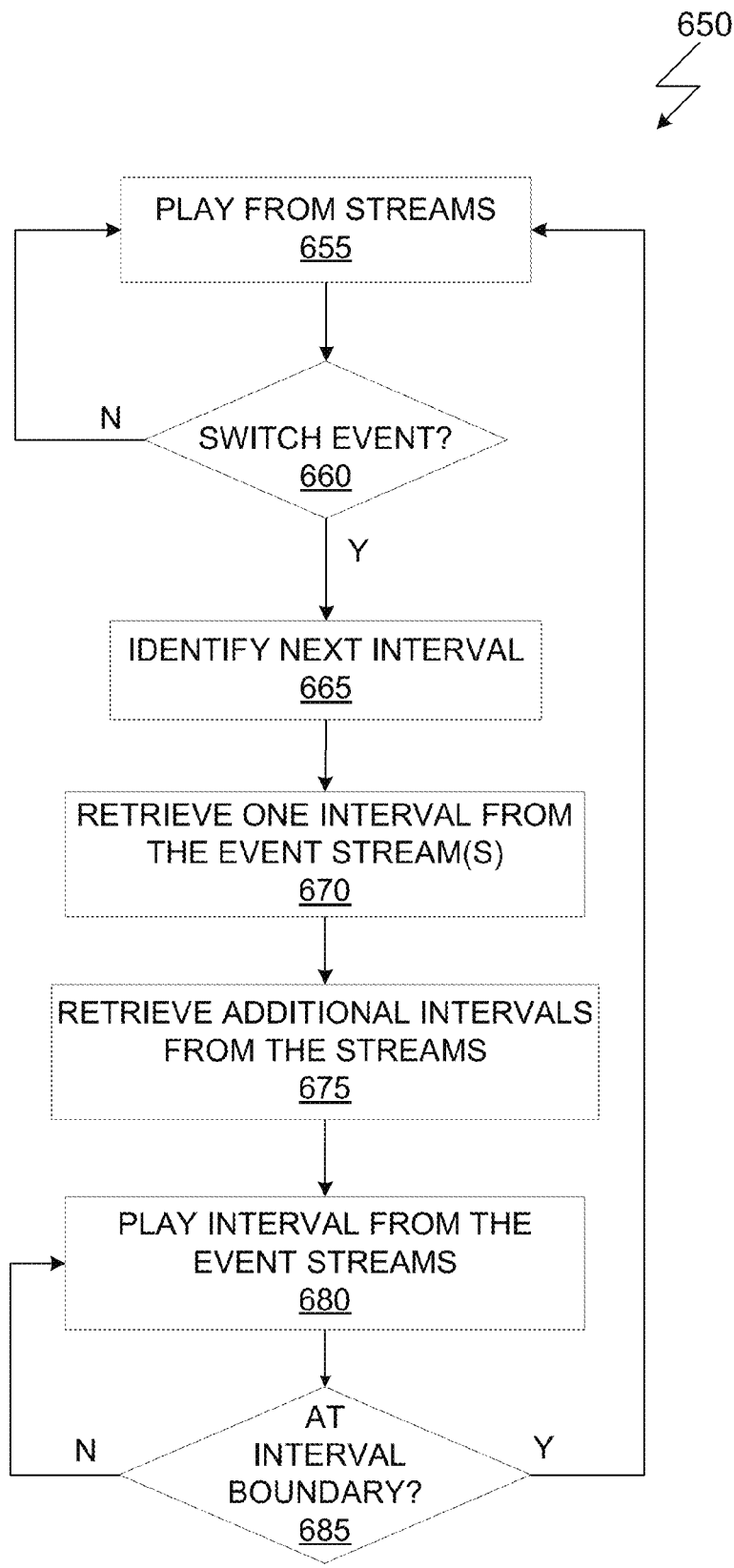
FIG. 6B is a flow diagram of method steps for playing a switch event stream and during playback of audio and video streams, according to one embodiment of the invention.

FIG. 6B is a flow diagram 650 of method steps for playing a switch event stream and during playback of audio and video streams, according to one embodiment of the invention. Although the method steps are described in conjunction with the systems for FIGS. 1, 2 and 5A, persons skilled in the art will understand that any system configured to perform the method steps, in any order, is within the scope of the invention.

A switch event occurs when supplementary audio and/or video data is overlaid during playback of digital media content. The supplementary audio and video data may include an out-of-band signal such as a chime or beep for an alarmclock, indication that a new message, email, voicemail, tweet, or other communication is received. The supplementary audio or video data may be unrelated to the digital media content that is being streamed for playback.

At step 655, the playback application 536 plays the audio and video streams for the digital media content. At step 660 the playback application 536 determines if a switch event has occurred during playback, and, if not, then the playback application 536 repeats step 655 to continue playing the digital media content. Otherwise, at step 665, the playback application 536 identifies the next interval in the audio and video streams.

At step 670, the playback application 536 retrieves one interval from the event streams that corresponds to the next interval. The audio event stream may be a modulated version of the original audio stream combined with the supplementary audio signal. Similarly, the video event stream may be a modulated version of the original video stream combined with the supplementary video signal.

At step 675, the playback application 536 initiates retrieval of additional intervals from the original audio and/or video streams. At step 680, the playback application 536 plays the one interval from the event streams. At step 685 the playback application 536 determines if an interval boundary is reached during playback of the event streams, and, if not, then the playback application 536 repeats step 680 to continue playing the event streams. Otherwise, at step 685, an interval boundary is reached and the playback application 546 returns to step 655 to play from the original streams.

One advantage of the disclosed technique is that audio data may be modulated and received by the streaming device for an audio fade-in effect. Similarly, video data may be modulated to perform various visual effects. Such a technique allows for fading-in of audio and/or video, fading-out of audio and/or video, and effects that blend audio from different content and video from different content during a transition from one digital media content to a different digital media content or within the same digital media content. A user may personalize the video and/or audio effects that are applied during transitions. The modulated audio and video data to generate the audio or video effect during a transition may be precomputed or computed on-the-fly, i.e., in real-time, and transmitted to the streaming device.

In one embodiment of the invention the streaming device 108 comprises an embedded computer platform such as a set top box. An alternative embodiment of the invention may be implemented as a program product that is downloaded to a memory within a computer system, for example as executable instructions embedded within an internet web site. In this embodiment, the streaming device 108 comprises the computer system.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A method, comprising:
   receiving a request from a streaming device for content associated with a video effect; and
   in response, transmitting to the streaming device at least a portion of a first video stream associated with the video effect and at least a portion of a first fade-in audio stream associated with the video effect,
   wherein the fade-in audio stream includes a modulated portion and a second portion, the second portion having volume levels that substantially match volume levels corresponding to an original audio stream that is associated with the video effect, and the modulated portion having volume levels that begin with a lowest volume level, increase across a fade-in envelope, and match a volume level corresponding to the original audio stream at a first point in time that delineates the end of the modulated portion and the start of the second portion.

2. The method of claim 1, further comprising generating the at least a portion of the fade-in audio stream in response to the request.

3. The method of claim 1, wherein the at least a portion of the fade-in audio stream is pre-computed.

4. The method of claim 1, wherein the fade-in audio stream comprises one modulated portion and one second portion.

5. The method of claim 1, wherein the request is associated with a transition between different content titles, the start of playback of a particular content title, the end of playback of a particular content title, or a trick play event.

6. The method of claim 1, wherein the fade-in audio stream is encoded using fixed rate audio intervals.

7. The method of claim 1, wherein the fade-in audio stream is encoded using variable rate audio intervals.

8. The method of claim 1, wherein the fade-in audio stream comprises a plurality of fade-in intervals, and each fade-in interval includes a modulated portion and a second portion.

9. The method of claim 8, wherein the at least a portion of the fade-in audio stream comprises a first fade-in interval included in the plurality of fade-in intervals, and further comprising transmitting to the streaming device the original audio stream that is associated with the video effect.

10. The method of claim 9, wherein the streaming device is configured playback the first fade-in interval and then switch to the original audio stream for playback.

11. The method of claim 9, wherein the request is associated with a trick play event associated with an interval boundary.

12. The method of claim 11, wherein the trick play event comprises a fast-forward operation or a rewind operation.

13. A non-transitory computer-readable medium including instructions that, when executed by a processor, cause the processor to perform the steps of:
   receiving a request from a streaming device for content associated with a video effect; and
   in response, transmitting to the streaming device at least a portion of a first video stream associated with the video effect and at least a portion of a first fade-in audio stream associated with the video effect,
   wherein the fade-in audio stream includes a modulated portion and a second portion, the second portion having volume levels that substantially match volume levels corresponding to an original audio stream that is associated with the video effect, and the modulated portion having volume levels that begin with a lowest volume level, increase across a fade-in envelope, and match a volume level corresponding to the original audio stream at a first point in time that delineates the end of the modulated portion and the start of the second portion.

14. The computer-readable medium of claim 13, further comprising generating the at least a portion of the fade-in audio stream in response to the request.

15. The computer-readable medium of claim 13, wherein the at least a portion of the fade-in audio stream is pre-computed.

16. The computer-readable medium of claim 13, wherein the fade-in audio stream comprises one modulated portion and one second portion.

17. The computer-readable medium of claim 13, wherein the request is associated with a transition between different content titles, the start of playback of a particular content title, the end of playback of a particular content title, or a trick play event.

18. The computer-readable medium of claim 13, wherein the fade-in audio stream comprises a plurality of fade-in intervals, and each fade-in interval includes a modulated portion and a second portion.

19. The computer-readable medium of claim 18, wherein the at least a portion of the fade-in audio stream comprises a first fade-in interval included in the plurality of fade-in intervals, and further comprising transmitting to the streaming device the original audio stream that is associated with the video effect.

20. The computer-readable medium of claim 19, wherein the streaming device is configured playback the first fade-in interval and then switch to the original audio stream for playback.

21. The computer-readable medium of claim 19, wherein the request is associated with a trick play event associated with an interval boundary.

22. The computer-readable medium of claim 21, wherein the trick play event comprises a fast-forward or a rewind operation.

23. A computing device, comprising:
a processor; and
a memory that stores an audio effect generator that is configured to generate at least a portion a first fade-in audio stream associated with a video effect,
wherein the fade-in audio stream includes a modulated portion and a second portion, the second portion having volume levels that substantially match volume levels corresponding to an original audio stream that is associated with the video effect, and the modulated portion having volume levels that begin with a lowest volume level, increase across a fade-in envelope, and match a volume level corresponding to the original audio stream at a first point in time that delineates the end of the modulated portion and the start of the second portion.

24. The computing device of claim 23, wherein the audio effect generator is configured to pre-compute the at least a portion of the fade-in audio stream.

25. The computing device of claim 23, wherein the audio effect generator is configured to generate the at least a portion of the fade-in audio stream in response to a streaming device requesting a video effect associated with the at least a portion of the fade-in audio stream.

* * * * *